Dec. 9, 1930.  L. D. LOVEKIN  1,784,492
LOCK JOINT
Filed Sept. 4, 1926
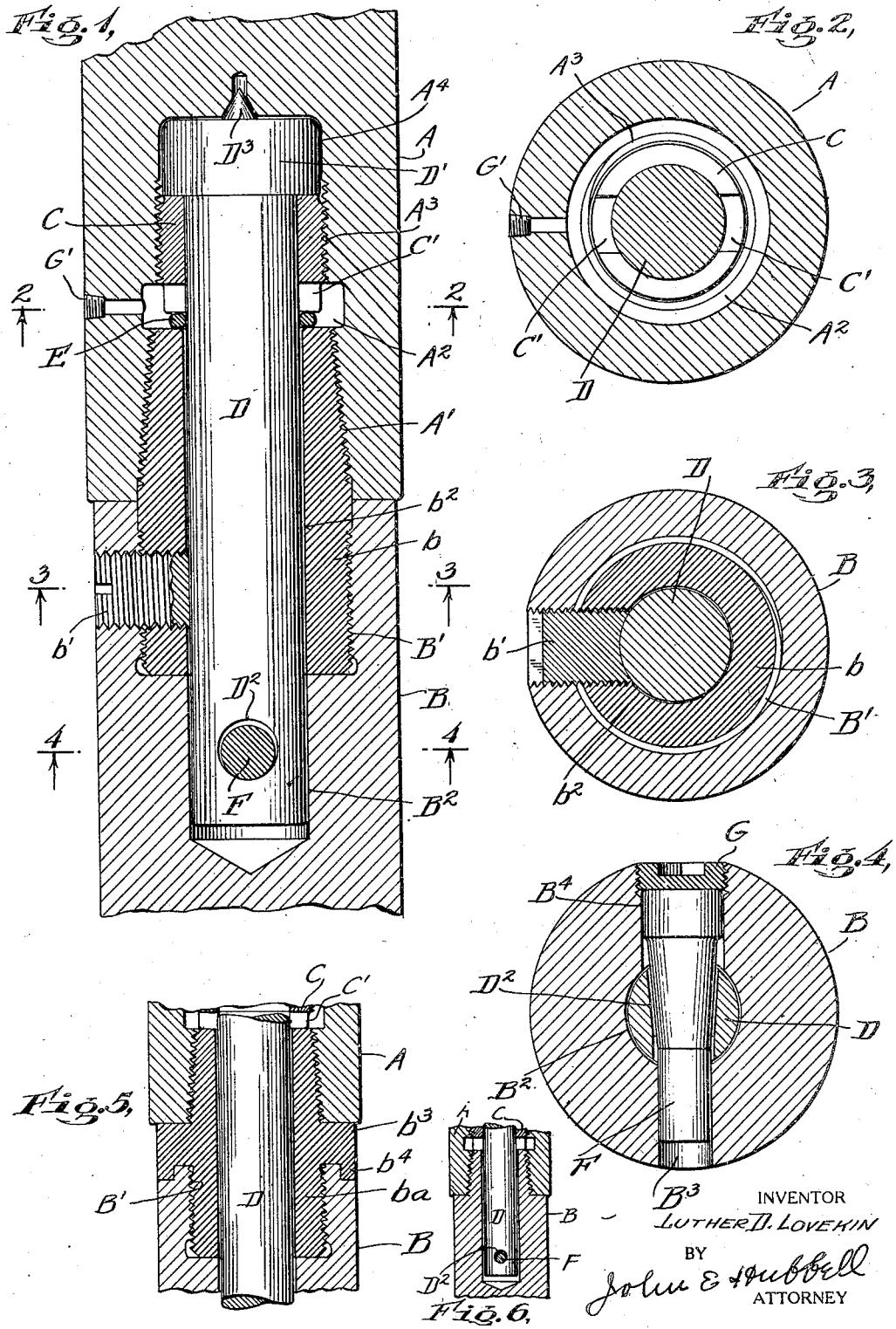
INVENTOR
LUTHER D. LOVEKIN
BY
John E. Hubbell
ATTORNEY Patented Dec. 9, 1930

1,784,492

UNITED STATES PATENT OFFICE

LUTHER D. LOVEKIN, OF WYNNEWOOD, PENNSYLVANIA

LOCK JOINT

Application filed September 4, 1926. Serial No. 133,550.

The general object of the present invention is to provide an improved lock joint primarily devised and well adapted for use under the severe conditions to which the shaft couplings and tool and shaft connections employed in cable oil well drilling operations are subjected, but my improved lock joint is not restricted to such use. A more specific object of the invention is to provide a lock joint of the type in which a pin portion of one of the parts coupled by the joint is threaded into a socket formed in the other part with a pin portion inherently stronger than has heretofore been employed. Another specific object of the present invention is to provide a lock joint of the type mentioned with improved means for locking the coupled parts against relative rotation loosening or unthreading the joint; and the invention is characterized in particular by the comparative ease with which a joint of the threaded pin and socket type may be made tight and opened, when necessary, and by the fact that much less force is required to screw the parts together and apart than is required with the simple threaded pin and socket connections heretofore commonly employed in shaft coupling for cable oil well drilling. The relatively small force required to couple and separate parts coupled by my improved lock joint makes it unnecessary to use the powerful jack mechanism commonly employed to screw oil well drilling shaft sections together and subjecting the parts coupled to such stresses that it has been a not infrequent occurrence for the threads to be stripped or the pin to be broken in the operation of making a coupling.

The various features of novelty which characterize my invention are pointed out with particularity in the claims annexed to and forming a part of this specification. For a better understanding of the invention, however, its specific advantages and objects attained with its use, reference should be had to the accompanying drawings and descriptive matter in which I have illustrated and described preferred embodiments of my invention.

Of the drawings:

Fig. 1 is an elevation partly in section;
Fig. 2 is a section on the broken line 2—2 of Fig. 1;
Fig. 3 is a section on the line 3—3 of Fig. 1;
Fig. 4 is a section on the line 4—4 of Fig. 1;
Fig. 5 is a view taken similarly to Fig. 1 illustrating a modified construction; and
Fig. 6 is a view taken similarly to Fig. 1, illustrating a modification.

In the drawings, A and B represent shaft sections coupled together by a joint constructed in accordance with the present invention. For cable oil well drilling the sections A and B may be steel shaft sections 30 feet or so long, and 5 or 6 inches in diameter, though, of course, the invention is not restricted to such dimensions or, indeed, to use in coupling shaft sections together. The shaft B is provided with a threaded pin or tenon portion to be screwed to the tapered internally threaded outer portion $A'$ of an axial socket formed in the shaft A. The pin portion $b$ may be integral with the shaft section B in some cases as shown in Fig. 6, but preferably is a separate piece screwed into an internally threaded socket $B'$ of the section B, and secured to the shaft section B in any suitable manner. As shown the pin $b$ is positively secured to the shaft section B by a threaded pin $b'$ screwed into registering threaded openings formed in the shell of the socket $B'$ and in the pin part $b$.

An untapered internally threaded intermediate portion $A^3$ of the socket in the shaft member A receives an externally threaded bushing or nut C which has an end portion projecting into the unthreaded socket portion $A^2$ between the portions $A'$ and $A^3$. The socket portions $A'$ and $A^3$ are oppositely threaded, that is to say, if the screw thread in the socket $A'$ is a right hand thread, the thread in the socket $A^3$ is a left hand thread. An axially disposed bolt D has its head $D'$ received in the portion $A^4$ of the socket in the member A between the end wall of the socket and the bushing C against which the head of the bolt bears. The body of the bolt passes through the bushing C and through an axial passage $b^2$ formed for the purpose in the pin $b$, into an extension $B^2$ of the last mentioned passage formed in the body of the shaft B.

A metal to metal contact subjected to a compression stress is maintained between the adjacent ends of the pin $b$ and bushing C in the assembled joint. Instead of having the end of the pin $b$ in direct engagement with the end of the bushing C, I preferably interpose a metal washer or ring E advantageously made of metal such as copper ductile enough to be subject to some deformation under the relatively moderate force to which it is subjected by the parts $b$ and C when the joint is tight. In the assembled joint, the body of the bolt D is rigidly secured to the shaft member B and put under tension by wedging means shown as comprising a pin F having a tapered body portion received in a correspondingly tapered, but slightly larger diametral passage $D^2$ formed in the body of the bolt D, and having cylindrical end portions received in aligned openings $B^3$ and $B^4$ formed in the wall of the socket $B'$. As shown, the pin F is prevented from working loose by means of a screw plug G screwed into the threaded outer end of the passage $B^4$ receiving the larger end of the pin F. $G'$ represents a plug normally closing an opening in the shell of the socket portion $A^2$ through which heavy grease or other lubricant may be injected into the interior of the joint structure if and when this is desirable. Advantageously, as shown, the bolt head $D'$ is formed with a tapered projection $D^3$ entering the tapered recess at the inner end of the socket in the member A, so that the head of the bolt D is accurately centered, and its rotation is facilitated. The bushing C has its outer end transversely slotted as indicated at $C'$ to facilitate engagement by a suitable screw driver tool for threading it into and out of the socket portion $A^3$.

In a preferred mode of assembling the parts shown in Figs. 1 to 4 now contemplated by me, the aligned axial passages $b^2$, $B^2$ will ordinarily be drilled or reamed after the pin $b$ is secured in place in the socket $B'$, and the pin $b'$ is initially of such length that its inner end is concaved in the drilling or reaming operation so that its concave end fits snugly against the body of the bolt D in the assembled joint and is thereby prevented from working loose. Before threading the pin $b$ into the socket portion $A'$, the bolt D and bushing C are put in place, the bushing C being adjusted to secure the desired endwise reaction between the bushing C and end of the pin $b$ in the assembled joint, while at the same time holding the head of the bolt D at a constant predetermined position along the axis of the shaft section A in which the bolt head has only sufficient room between the bushing C and the end of the socket in which it is received to permit easy rotation of the bolt. The use of the interposed ductile washer member E requires less care in adjusting the part C than would be necessary if the washer E were not used. After the parts are thus threaded together, the pin F is forced home with sufficient pressure to put the body of the bolt D under some tension and to increase the reactive pressure between the bushing C and the end of the pin $b$. With the parts thus connected together it is impossible to loosen the joint by forces tending to screw the pin $b$ out of the socket portion $A'$, since the parts are so clamped together that such rotation of the pin $b$ in the socket portion $A'$ would rotate the bushing C in the direction tending through the bolt D to draw the pin $b$ farther into the socket. Aside from the feature just referred to, the joint is characterized by the fact that the parts are so connected and arranged that the tendency to any initial relative movement of the parts and consequent loosening and weakening of the joint is practically eliminated.

The invention is characterized by the following advantages: If the pin $b$ is made of chrome-vanadium steel, or other high grade steel alloy, as it may readily be, it is stronger than an integral solid pin portion of the shaft B could be, when the latter is made of the best steel which cost considerations permit to be used for the purpose. The pin portion of an ordinary threaded pin and socket joint is the weakest portion of the joint and in consequence my improved lock joint may be made inherently stronger than any joint now in use for the same general purpose. In practice therefore the invention is particularly characterized by the ease with which the parts may be assembled. Since the parts that are threaded together need to be screwed home with sufficient force only to insure good metal to metal contact, there is no necessity for the use of the powerful jacks now commonly employed to couple cable oil well driven shafts, and no danger of the thread being stripped or the pin broken by the force employed in screwing the parts together. The internal parts of the joint may be lubricated with heavy grease to prevent oxidation, and to facilitate uncoupling the shaft sections when this is necessary, which is something unheard of in cable oil well drilling shaft joints as heretofore constructed, because with prior joint constructions the use of grease would merely increase the already great tendency of the joints to work loose in use.

Even though the threads directly connecting the pin $b$ to this shaft section A are stripped, or the pin $b$ or the wall of the socket portion of the shaft A in which the pin is received is fractured in use, the bolt D may serve to hold the shaft sections A and B together while they are being removed, thus reducing the number of expensive and time consuming fishing operations which have to be conducted. The fact that the bolt D is rotatable relative to the bushing C makes it possible to effect the exact axial adjustment of the bushing C required for the metal to metal contact between the pin $b$ and bushing C and to secure the proper longitudinal position of the bolt D while at the same time having the opening $D^2$ in the bolt D in alignment with the passages $B^3$ and $B^4$, when the parts are tightened up. No shims or the like are required in connection with the tapered pin F by which the bolt is put under tension. The desired strength can be secured with a shorter pin than has heretofore been required, not only because the pin is made of stronger metal than the body of the shaft, but also because the bolt D and bushing C contribute a portion of the strength required. The joint may be taken apart when necessary and reassembled without requiring new parts and in many cases without requiring any machining of the parts. In case the thrust surfaces need be faced off preparatory to reassembly, all that is ordinarily required to insure the desired tightness in the reassembled joint, is the insertion of a suitable washer between the abutting ends of the body portions of the shaft sections A and B. This does not interfere with the maintenance of a constant distance between the axis of the pin F and the head of the bolt D.

In some cases I may employ in lieu of the pin member $b$ shown in Figs. 1 to 4, the modified form of pin, $ba$, shown in Fig. 5, which differs from the pin $b$ primarily in that the pin $ba$ is provided with a circumferential flange $b^3$ intermediate its threaded portions, and against which the ends of the shell portions of the shaft members A and B abut where the joint is assembled, and in that said flange $b^3$ is formed with an axially extending portion $b^4$ surrounding the correspondingly reduced end portion of the shaft section B. With this arrangement the portion $b^4$ forms a strong tire or reinforcing band for the wall of the socket B' of the shaft section B, materially increasing the resistance of said socket wall to stresses tending to split said wall.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. In a lock joint construction, a part formed with a socket comprising a tapered and threaded outer portion and an intermediate oppositely threaded portion, an externally threaded bushing screwed into said intermediate socket portion, a bolt having its head received in the inner portion of the socket and bearing against the inner end of said bushing and having its body portion extending through said bushing and projecting out of said socket, and a part having a tapered externally threaded portion screwed into said tapered socket portion and formed with an axial passage receiving said bolt, and means connecting said bolt and second part to prevent their relative rotation.

2. In a lock joint construction, a part formed with a socket comprising a tapered and threaded outer portion and an intermediate oppositely threaded portion, an externally threaded bushing screwed into said intermediate socket portion, a bolt having its head received in said socket at the inner side of said intermediate portion, and having its body portion extending through said bushing and projecting out of said socket, and a part having a tapered externally threaded pin portion screwed into said tapered socket portion and formed with an axial passage into which said bolt extends and a tapered key connecting said bolt and second part to prevent their relative rotation and to subject them to a wedging force putting the body of the bolt under tension.

3. In a lock joint construction, a part formed with a socket comprising a tapered and threaded outer portion and an intermediate oppositely threaded portion, an externally threaded bushing screwed into said intermediate socket portion, a bolt having its head received in the inner portion of the socket and bearing against the inner end of said bushing and having its body portion extending through said bushing and projecting out of said socket, and a part having a tapered externally threaded portion screwed into said tapered socket portion and formed with an axial passage receiving said bolt, a washer of ductile metal compressed between said bushing and said externally threaded portion, and means connecting said bolt and second part to prevent their relative rotation.

4. In a sectional oil well drilling shaft, a shaft section formed with an axial socket at one end comprising a tapered and threaded outer portion and an intermediate oppositely threaded portion, an externally threaded bushing screwed into said intermediate socket portion, a bolt having its head received in the inner portion of the socket and bearing against the inner end of said bushing and having its body portion extending through said bushing and projecting out of said socket, a second shaft section having a threaded socket in one end, a part having one end screwed into the last mentioned socket and having its other end tapered and screwed into said tapered socket portion, and formed with an axial passage receiving said bolt, and tapered key means connecting said bolt and second shaft section to prevent their relative rotation and to subject the end to a wedging force putting the body of the bolt under tension.

5. In a lock-joint construction, a part formed with a socket comprising a tapered and threaded outer portion and an intermediate oppositely threaded portion, and an axial portion of reduced diameter at its inner end, an externally threaded bushing screwed into said intermediate socket portion, a bolt having its head received in the inner portion of the socket and bearing against the inner end of said bushing and having an axial projection received in, and centered by said axial portion of said socket, and having its body portion extending through said bushing and projecting out of said socket, and a part having a tapered externally threaded portion screwed into said socket portion and formed with an axial passage receiving said bolt, and tapered key means connecting said bolt and second part to prevent their relative rotation and to subject them to a wedging force putting the body of the bolt under tension.

6. In a lock joint construction, a part formed with a socket comprising a threaded outer portion and an inner portion, a bolt having its head rotatably received in the inner portion of said socket and having its body portion projecting out of said socket, means carried by said part normally engaging said head to prevent said bolt from being moved axially out of said socket, a second part having an externally threaded portion screwed into said outer socket portion and formed with an axial passage receiving said bolt body portion, and means for maintaining said second part and bolt in fixed axial relation.

7. In a lock joint construction, a part formed with a socket comprising a threaded outer portion and an inner portion, a bolt having its head rotatably received in the inner portion of said socket and having its body portion projecting out of said socket, a second part having an externally threaded portion screwed into said outer socket portion and formed with an axial passage receiving said bolt body portion, means comprising a shoulder in said socket portion engaging said bolt head for maintaining the first mentioned part and bolt in fixed axial relation, and means for preventing axial and relative rotative movements between said bolt and second part.

8. In a lock joint construction, a part formed with a socket comprising a threaded outer portion and an inner portion, a bolt having its head rotatably received in the inner portion of said socket and having a projecting body portion associated with said part, means for engaging said bolt head to prevent axial movement of said part and bolt, a second part having an externally threaded portion screwed into said outer socket portion and formed with an axial passage receiving said bolt body portion, and means connecting said bolt and second part to prevent their relative rotation.

Signed at New York city, in the county of New York, and State of New York, this 3rd day of September, A. D. 1926.

LUTHER D. LOVEKIN.